United States Patent

[11] 3,558,971

| [72] | Inventor | Urban Molin |
| | | Fregattvagen 15, Lidingo, Sweden |
| [21] | Appl. No. | 680,745 |
| [22] | Filed | Nov. 6, 1967 |
| [45] | Patented | Jan. 26, 1971 |
| [32] | Priority | Nov. 8, 1966 |
| [33] | | Sweden |
| [31] | | 15225/66 |

[54] VEHICLE LIGHTING PLANTS
10 Claims, 6 Drawing Figs.
[52] U.S. Cl..................................... 315/77,
315/82, 315/83
[51] Int. Cl..................................... B60q 1/02
[50] Field of Search........................ 315/77, 82, 83

[56] References Cited
FOREIGN PATENTS
530,540  12/1940  Great Britain................ 315/83

Primary Examiner—John W. Huckert
Assistant Examiner—R. F. Polissack
Attorney—Holman, Glascock, Downing & Seebold ABSTRACT: An improvement in vehicle lighting plants in which an emergency lighting plant for the illumination of the roadway and which serves as standby equipment in the event of a failure of the main lighting plant is activated by feeding the emergency lighting plant with current via a self-retaining relay.

PATENTED JAN 26 1971 3,558,971

INVENTOR
U. Molin

BY Adamack, Downing & Seebold
ATTORNEYS 3,558,971

VEHICLE LIGHTING PLANTS

BACKGROUND OF THE INVENTION

In a conventional vehicle lighting plant there are numerous points where a loosened contact screw, a broken lead, a short circuit by damaged cable insulation etcetera may cause a sudden and unexpected extinguishing of the headlights. If this occurs, particularly at high driving speeds on a circuitous road, there exists the risk of a serious traffic accident.

In order to eliminate or at least reduce this risk, it is a common precaution to equip vehicles with one or a plurality of supplementary headlights, which can be activated by means of a separate switch. Such supplementary headlights in order to function even in the event of a short circuit in the main lighting plant, are adapted to be fed with current direct from the battery. However, one serious objection to such emergency lighting plants is that to function, such plants require a separate action by the driver, namely the actuation of a switch. This action is no trained reflex of the driver, and if it has to be executed during a sudden blackout of the main headlights, there is usually insufficient time to determine what has happened, make a decision, and activate the supplementary headlights. During this period the driver is in what may be termed a state of mental and physical unbalance, that is decide to remove a hand from the steering wheel, and, in complete darkness, locate the proper switch and actuate such switch. This procedure may require at least 2 to 3 seconds, which, at a speed of 60 miles per hour, corresponds to a driving distance of 60 to 90 yards. On the other hand, the driver could, when starting a trip during the dark, activate the supplementary headlights, which, however, may be neglected.

SUMMARY OF THE INVENTION

The present emergency lighting plant eliminates the above disadvantages in that it is disposed to be activated exclusively in dependence on the activation of the main lighting plant, but not be inactivated by an intentional, or by electrical failures of the main lighting plant. For deactivating the supplementary headlights, a separate procedure is required, either manually by the driver by actuating a circuit breaker, or in dependence upon some action occurring at the termination of the trip, such as deactivating the engine or opening a door of the vehicle.

Specific embodiments of the invention will now be described by way of examples with reference to the accompanying drawings in which for simplicity are a most common arrangement, namely a one-wire system wherein the return leads of all current consumers are directed through a ground, i.e. the metallic chassis of the vehicle, but all points designated by the symbol ⊥ can be interconnected by an insulated return lead to an electric power supply to provide a two-wire system.

DETAILED DESCRIPTION OF THE INVENTION

Figure 1:
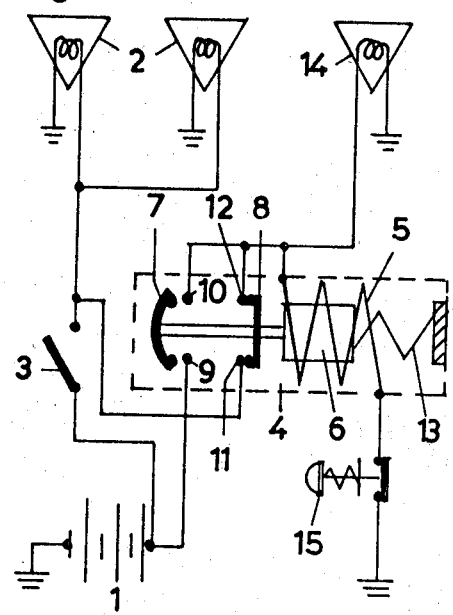
FIGS. 1—3 are diagrammatic views of the wiring of an emergency lighting plant in accordance with the invention in three different operating stages.

FIG. 1 illustrates the rest stage in which the main and the emergency lighting plants are deactivated, and this stage corresponds to a parked vehicle or daylight driving without lights. More particularly there is disclosed a power supply 1, usually an accumulating battery, two main headlights 2 and a headlight switch 3 which constitute the main lighting plant. The switch 3 is shown in its open position in FIG. 1. A magnetic contactor 4 is provided with an electric coil 5 and a magnetic core 6 movably disposed within the coil or close thereto. A pretensioned spring member 13 is disposed within or close to the coil and is adapted to bias the magnetic core in the longitudinal direction. The magnetic core or an extension thereof carries two contact bridges 7 and 8 which, by displacement of the magnetic core in one direction closes a pair of contacts 9, 10 and opens another pair of contacts 11, 12 while in the other direction opens the contacts 9, 10 and closes the contacts 11, 12. By means of suitably effected springing characteristic of either the contact bridges 7 and 8 or the contacts 9, 10 and 11, 12 or both (in the FIG. the contact bridges are shown as resilient members), an overlap of the closed contact periods is achieved, so that, during a certain part of the displacement of the magnetic core 6, preferably symmetrically disposed around its half way position, the two contact pairs are simultaneously closed, thereby obtaining an uninterrupted supply of current to the coil 5 during the entire displacement of the magnetic core 6. The coil 5 and a supplementary headlight 14 are supplied with current through the electrically interconnected contacts 10 and 12 when these contacts are connected with the power supply 1. A push button actuated circuit breaker 15 is disposed in the return lead to ground from the coil 5. The breaker 15 is provided with a pretensioned spring which, in the rest position of the breaker, maintains the circuit closed through the coil 5. The contact 11 is electrically connected with the main lighting plant at a point located between the headlights 2 and the headlight switch 3.

It should be mentioned, that only one of the two headlights of the main lighting plant or one of two pairs of such headlights could constitute the main lighting plant, so the remaining headlight or pair of main headlights respectively would define the emergency lighting plant.

It should also be emphasized that, if the present emergency lighting plant is included in the vehicle as produced, the supplementary headlight or headlights 14 could be built-in one or both of the main headlights 2 as integral part thereof.

Figure 2:
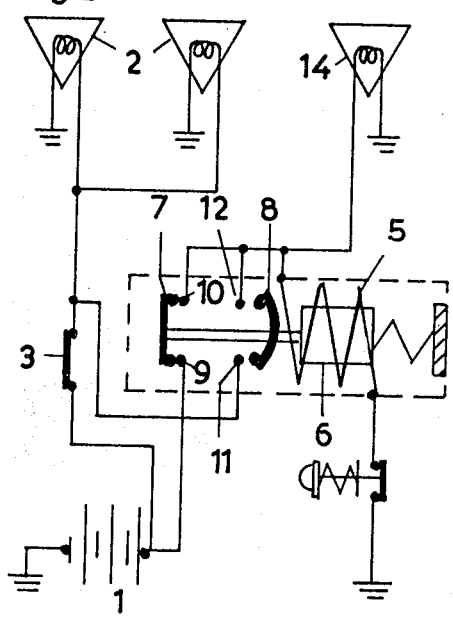

FIG. 2 illustrates the stage when the switch 3 has been activated to engage the main lighting plant. The coil 5 is, by this activation, energized from the power supply 1 by the contact bridge 8 and the contact pair 11, 12, and the supplementary headlight 14 are activated. The magnetic core 6 commences its inward displacement relative to the coil 5. During this displacement, the contact pair 9, 10 is closed by the contact bridge 7. When the magnetic core 6 has completed its aforesaid inward displacement, the contact pair 9, 10 remains closed and the supplementary headlight 14 activated, whereas the contact pair 11, 12 has been opened. By means of the overlap of the closed contact periods, referred to above, of the contact pairs 9, 10 and 11, 12, the supply of current to the coil 5 remains uninterrupted during the entire displacement of the magnetic core 6.

Figure 3:
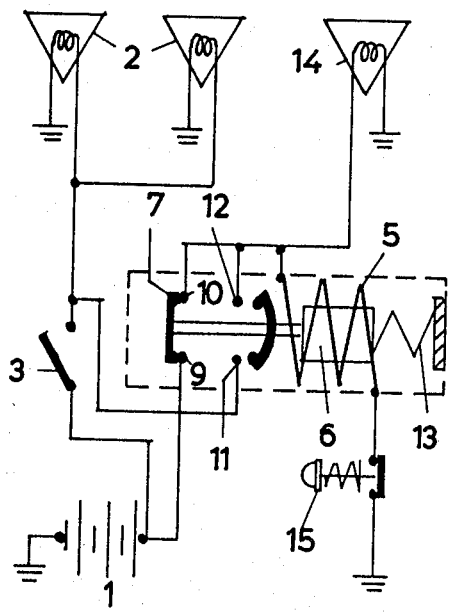

FIG. 3 discloses the stage when the main headlights 2 have been extinguished either intentionally by deactivation of the switch 3 or unintentionally by electrical failures such as lead breakdowns in the main lighting plant. For the sake of simplicity, this is shown only as deactivated switch 3. The supplementary headlight 14 remains activated as it is being supplied with current from the power supply 1 through the contact bridge 7 and the pair of contacts 9, 10, and as the coil 5 is being energized the same way, the supply of current is maintained. The function of the emergency lighting plant can, in this stage, not be impaired even by an electrical failure such as a short circuit in the main lighting plant, as the two plants are entirely separated electrically by the opening of the contact pair 11, 12. The supplementary headlight 14 can now be extinguished exclusively by merely a temporary actuation of the circuit breaker 15, whereby the coil 5 is deenergized and the return spring 13 displaces the magnetic core 6 to its rest position as shown in FIG. 1.

It should also be pointed out that the stationary contacts 9, 10, 11, 12 can be movably arranged against the action of pretensioned springs and in the direction of the movement of the magnetic core 6, so that the contact bridges 7, 8 may be either resilient or rigid.

By the deactivation of the main lighting plant independent extinguishing of the supplementary headlight 14, the driver obtains, each time upon completing a trip in the darkness, a check that the emergency lighting plant is intact.

To safeguard the extinguishing of the supplementary headlight 14 even in the event the driver neglects to actuate the circuit breaker 15, the circuit breaker can be actuated in dependence upon, at the termination of a trip some action such as deactivating the engine, opening a door, etcetera. If the circuit breaker is in the form of a door contact, it has to retain the relay circuit through the coil 5 closed by the closed door and interrupt this circuit upon opening of the door. It should be stated that more than one circuit breaker 15 can be accommodated namely one manually operated and one door contact and in this situation such breakers must be connected in series so that the extinguishing operation may be effected via any one thereof.

Alternative embodiments of the magnetic contactor 4 and particularly its system of switching contacts can be used without changing its working characteristics.

Figure 4:
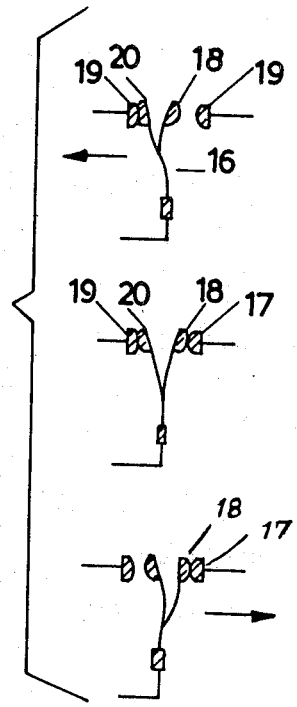
FIGS. 4—6 are views of three alternative embodiments of pertinent switching devices.

The two electrically interconnected contacts 10 and 12 can, as shown in FIG. 4, be movably arranged, preferably mounted onto an electrically conductive, and with the emergency lighting plant electrically connected, resilient rocker member 16 mechanically actuated by the magnetic core 6 to execute a rocking movement around a fixed center, whereby the contact 12 is replaced by contact 20 and the contact 10 by contact 18. By this arrangement, the number of stationary and movable contacts can be reduced from six to four. In the rest position in which the magnetic core 6 is retained in its extreme position outwards of or farthermost from the coil 5, i.e. to the left as shown in the top view, the contact 20 is pressed against the stationary contact 19 which corresponds to the contact 11 and electrically connected with the main lighting plant. In the engaged position, i.e. to the right as shown in the bottom view, the contact 18 is pressed against the stationary contact 17, (corresponding to the contact 9) and electrically connected with the power supply 1. The intermediate view shows the overlapping period which is attained by a suitable existing distance between the stationary contacts 17 and 19 and the resilient characteristic of the rocker 16 when all contacts 17, 18, 19, 20 are electrically interconnected.

It should also be pointed out that the contacts 17 and 19 can be movably disposed against the bias of pretensioned springs and in the direction of the movement of the magnetic core 6, whereby the rocker 16 may be either resilient or rigid.

Figure 5:
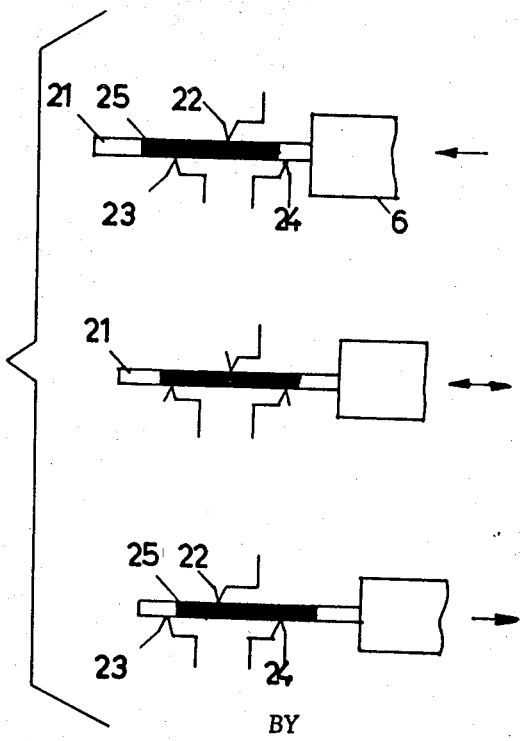

FIG. 5 shows another embodiment of the system of switching contacts in which three stationary resilient trailing contacts 22, 23, 24 rest against the surface of a rod member 21 movable coaxially with the magnetic core 6 and mechanically affixed thereto. The intermediate contact 22 the contact 23 and the contact 24 are electrically connected with the emergency lighting plant i.e. the supplementary headlight 14 and the electric coil 5, the main lighting plant, i.e. the main headlights 2 and the power supply 1 respectively. The surface of the rod is electrically conductive along a certain portion 25 thereof, but otherwise the rod is nonconductive. The length of the conductive portion is somewhat greater than the distance between the contacts 23 and 24, and the positions of contacts 23 and 24 in relation to the rod are such that the conductive portion 25 is in connection only with the contact 23 when the magnetic core 6 is in its end position corresponding to the deenergized coil 5 as shown in the top view and with only the contact 24 when the magnetic core is in its other end position corresponding to the energized coil 5, as shown in the bottom view. The contact 22 remains in connection with the conductive portion 25 during the entire movement of the magnet core and the rod. During a certain part of this movement, an overlap of the closed contact periods is achieved when all three contacts are electrically interconnected by the conductive portion 25 of the rod, as shown in the intermediate view of FIG. 5.

Figure 6:
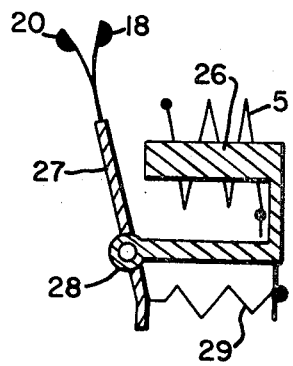

FIG. 6 illustrates a further embodiment of the magnetic contactor 4 wherein the contactor is provided with an electric coil 5, a stationary magnet core 26 disposed within the coil and an external magnetic yoke means magnetically connected with the core to constitute a magnetic circuit. A member thereof is defined by a movable magnet core 27 adapted to turn around a fixed center 28 against the action of pretensioned spring means 29 and accommodate the two movable contacts 18 and 20 referred to in connection with FIG. 4.

I claim:

1. An emergency lighting system, particularly for a vehicle, comprising a main lighting plant having at least one main headlight, a source of electrical power, a first lead between said source and said one main headlight, an operating switch for said first lead, at least one supplementary headlight, a switching device including an electric coil, a magnet core movable coaxially within said coil, spring means biasing said magnet core in the longitudinal direction, fixed contacts, and movable contacts actuated by the magnet core for cooperation with the fixed contacts, a second lead between said source and said supplementary headlight via said switching device, a third lead between said first lead and intermediate said operating switch and said one main headlight and said second lead via said switching device, a further lead between said third lead and said coil, said coil, magnet core and certain of said contacts constituting a self-retaining relay, and a circuit breaker disposed in the relay circuit, the arrangement being such that the closing of said operating switch activates said one main headlight and said supplementary headlight and coil via said switching device, with said supplementary headlight after being activated and connected to said self-retaining relay remaining activated due to said relay even following deactivation of said one main headlight yet being capable of being deactivated by a temporary interruption of the relay circuit via actuation of said circuit breaker.

2. The emergency lighting system as claimed in claim 10 in which said fixed contacts are defined by two spaced pairs of contacts and said movable contacts by two spaced resilient bridges mechanically rigidly interconnected and affixed to said magnet core.

3. The emergency lighting plant as claimed in claim 2 in which said contacts are displaced against the action of pretensioned spring means by actuation of contact bridge means movable coaxially with said magnet core.

4. The emergency lighting system as claimed in claim 1 in which said contacts include two resilient arms, a contact carried by each arm, the free ends of said arms being joined to provide a rocker member mechanically secured to said magnet core, a stationary contact connected with said first lead cooperable with the contact with one of said arms when said magnet core is in one end position in which said coil is deenergized and a second stationary contact connected with said second lead cooperable with the contact of the other arm when said magnet core is in its other end position energizing said coil and said rocker member due to its resilience during a certain part of the movement of said magnetic core interconnecting said arm carrying contacts and said two stationary contacts.

5. The emergency lighting system as claimed in claim 4 in which said stationary contacts are displaced against the bias of pretensioned spring means.

6. The emergency lighting system as claimed in claim 1 in which said contacts include three resilient trailing contacts, rod means mechanically fixed to and movable with said magnetic core against which said resilient contacts rest, said rod means having an electrically conductive portion and nonconductive portions, whereby the intermediate contact remains in connection with the conductive portion during the entire movement of said magnet core, with the length of said conductive portion being greater than the distance between the two outermost contacts and said conductive portion providing a connection between the outer contact connected with said first lead in one end position of the magnet core and between the intermediate contact and the outermost contact connected with said second lead in the other end position of the magnet core.

7. The emergency lighting system as claimed in claim 1 in which said switching device includes said electric coil, a stationary magnet core located within said coil, magnet yoke means located exteriorally of said coil connected to said stationary magnet core to define a magnetic circuit, including a movable magnet core for swiveling movement about a fixed center against the action of pretension spring means, and two contacts carried by said movable magnet core.

8. The emergency lighting system as claimed in claim 1 in which said circuit breaker is actuated by movement of a door of the vehicle.

9. The emergency lighting system as claimed in claim 1 in which said circuit breaker is actuated by the engine conditions of the vehicle.

10. The emergency lighting system as claimed in claim 1 in which said circuit breaker is actuated upon the oil pressure of the vehicle engine.